United States Patent
Johnston et al.

(10) Patent No.: US 6,189,142 B1
(45) Date of Patent: Feb. 13, 2001

(54) VISUAL PROGRAM RUNTIME PERFORMANCE ANALYSIS

(75) Inventors: Gary Martin Johnston, Durham, NC (US); Mila Keren, Nesher (IL); Anthony Hayden Lindsey, Fuquay Varina, NC (US); Yael Shaham-Gafni, Haifa (IL)

(73) Assignee: International Business Machines Corporation, Armonk, NY (US)

(*) Notice: Under 35 U.S.C. 154(b), the term of this patent shall be extended for 0 days.

(21) Appl. No.: 09/154,126

(22) Filed: Sep. 16, 1998

(51) Int. Cl.[7] .................................................. G06F 9/45
(52) U.S. Cl. ........................... 717/4; 717/2; 702/186; 714/35; 714/38; 714/39; 714/47; 345/339; 345/334; 345/349; 345/967
(58) Field of Search ....................... 717/4, 1, 2; 714/35, 714/38, 39, 47, 45, 46; 345/333, 339, 326, 967, 968, 334, 348, 349; 702/182, 183, 186

(56) References Cited

U.S. PATENT DOCUMENTS

| | | | |
|---|---|---|---|
| 5,307,498 | * 4/1994 | Eisen et al. | 395/704 |
| 5,511,185 | * 4/1996 | Weinbaum et al. | 714/38 |
| 5,657,438 | * 8/1997 | Wygodny et al. | 714/1 |
| 5,781,720 | * 7/1998 | Parker et al. | 714/38 |
| 5,832,270 | * 11/1998 | Laffra et al. | 395/703 |
| 5,905,856 | * 5/1999 | Ottensooser | 714/38 |
| 5,926,176 | * 7/1999 | McMillan et al. | 345/339 |
| 5,974,572 | * 10/1999 | Weinberg et al. | 714/47 |

OTHER PUBLICATIONS

Kelly C. Bourne, "Client/Server Testing Tools," Article DBMS, May 1996 [online]. DBMS Online [retrieved on Mar. 1, 2000] 10 pages.* Retrieved from the Internet:<URL:www.dbmsmag.com/9606d16.html>.*

Bieman et al, "Using Fault Injection to Increase Software Test Coverage," IEEE Proceedings., Seventh Int'l Symposium on Software Reliability Engineering, Oct. 30.–Nov. 2, 1996, pp. 166–174.*

Ostrand et al, "A Visual Test Development Environment for GUI Systems, "Proceedings.of ACM SIGSOFT Int'l Symp. on Software Testing and Analysis, Mar. 2–4, 1998, pp. 82–92.*

Beer et al, "IDATG: An Open Tool for Automated Testing of Interactive Software," IEEE Proceedings., Compsac '98 The Twenty–Second Annual Int'l of Computer Software and Applications Conference, Aug. 19–21, 1998, pp. 470–475.*

* cited by examiner

Primary Examiner—Kakali Chaki
Assistant Examiner—Tuan Q. Dam
(74) Attorney, Agent, or Firm—Gregory M. Doudnikoff; Marcia L. Doubet

(57) ABSTRACT

A method, system, and computer program for providing runtime performance analysis in a visual programming environment. A performance data collection technique for visual programming is defined, which accounts for the specialized nature of visual programming, and the analysis is based on this collected data. The performance data is expressed in terms of elements familiar to the visual programmer, as opposed to using a source code approach. In a preferred embodiment, these elements comprise events, actions, connections, and attributes. The code implementing a visual program is instrumented according to this performance data collection technique, and performance information is gathered as the instrumented program executes. Preferably, the information gathered comprises execution counts and elapsed time per element.

18 Claims, 6 Drawing Sheets

VISUAL PROGRAM RUNTIME PERFORMANCE ANALYSIS

CROSS-REFERENCES TO RELATED INVENTIONS

This application is related to U.S. patent application Ser. No. 09/154,127 entitled "A Technique for Test Coverage of Visual Prograns"; U.S. patent application Ser. No. 09/154,231 entitled "Presentation of Visual Program Test Coverage Information"; and U.S. patent application Ser. No. 09/154,121 entitled "Presentation of Visual Program Performance Data", all assigned to International Business Machines Corporation (IBM) and filed concurrently herewith.

FIELD OF THE INVENTION

The present invention relates to computer software, and deals more particularly with a method, system, and computer program for providing runtime performance analysis in a visual programming environment. A data collection technique is defined for performance monitoring and analysis in the visual programming environment. Information is gathered on the length of time required to execute visual programming elements, and on the number of times a particular visual programming element is executed.

DESCRIPTION OF THE RELATED ART

In evaluating and optimizing computer programs, it is desirable to obtain performance information from the actual execution of the program, such as information about the time required for executing different parts of the program, or the number of times specific parts of the code are executed. "Performance monitoring" is concerned with monitoring execution dynamics of the software under situations that simulate, as nearly as practical, the actual operating environment in which the software is intended to run. The data gathered during this monitoring, or tracing, are then analyzed to locate the corresponding places in the code that form bottlenecks. Analysis of the code can then be made, with the goal of changing the program in some way to remove the performance problem. Additionally, the data gathered during performance monitoring may indicate those places in the code where a significant amount of overall execution time occurred. The programmer can then analyze (and possibly modify) that code to ensure that it is performing acceptably.

Performance monitoring is often referred to equivalently as performance benchmarking or performance testing, because the execution that simulates the actual operating environment is a "test" of the program's execution characteristics. The analysis process may also be referred to as performance tuning, although performance tuning is a broader term which encompasses the notion of changing the code, or "tuning" it, in an attempt to improve performance. For ease of reference, the term "performance analysis" will be used hereinafter as a shorthand for "performance monitoring and analysis", unless otherwise stated.

Performance analysis may focus on a number of different aspects of program execution. Some execution characteristics are user-oriented, while others are system-oriented. As an example of the former, response time may be measured, where the time that elapses between a user's request and the program's response to the user is calculated for the purpose of comparing it to what a user may consider "acceptable". System-oriented characteristics are concerned with whether the system resources, such as the central processing unit and main storage, are being used in the most productive manner.

Many techniques and tools exist today for monitoring the execution dynamics of programs written using conventional programming languages. Two common techniques are: (1) tracing, which gathers data (e.g. elapsed execution time, and execution counters) each time a function (or procedure, equivalently) is called; and (2) profiling, which uses periodic sampling of the execution stack to determine an estimate of what percentage of the execution time was spent in a specific function (or how many times it was executed). Both of these techniques are concerned with conventional code elements. However, component-based visual programs are different from conventional programs in several important ways. Because of these differences, known performance monitoring and analysis techniques cannot be applied to this new programming domain in a way that provides meaningful results. (The term "visual program" is used herein as a shorthand for "component-based visual program".)

A first difference between visual programs and conventional programs relates to the types of building blocks used by a programmer in creating a program, and a second difference lies in the source of those building blocks. Visual programs are graphically constructed primarily from pre-built components, equivalently referred to as "parts", which are typically supplied (along with the code which implements those components) by the vendor of the visual programming environment (or by a third-party vendor of such parts). Examples of visual programming environments are VisualAge for Java and VisualAge Smalltalk, from the International Business Machines Corporation ("IBM"). VisualAge is a registered trademark of IBM, and Java is a trademark of Sun Microsystems, Inc. A conventional programmer, on the other hand, typically writes program code himself using textual source-code statements of a programming language such as the C language. The source code statements specify data definition, as well as all operations on the data that are required in order to achieve the desired end result. Alternatively, in an object-oriented programming environment, the object-oriented programmer writes programs in a programming language such as Smalltalk, by creating or re-using objects and methods. Because the object-oriented programmer writes programs using source language coding statements, object-oriented programming will be considered as a "conventional" programming environment for purposes of the present invention.

The visual programmer writes a program by selecting from the pre-built components (often by selecting visual representations of these components), and specifying how, and in what sequence, the selected components will interact. The visual programming environment software then generates executable code that creates runtime objects that will implement the specified interactions. This generated code is constructed by the visual programming environment, and the visual programmer may have no idea of the performance implications of invoking/using this code. Further, because this generated code is created automatically by the programming environment, the programmer may raise support and warranty issues by altering it for tuning performance. In addition, because visual programs are written using components and interactions, profiling information expressed in terms of the number of calls to various functions, or the amount of execution time spent in each, does not provide useful data to the visual programmer. And, if profiling information expressed in these terms indicates inefficiencies, there is no correlation to the components and/or interactions which are the ones needing performance tuning. Finally, showing the visual programmer performance data in terms of the underlying code requires him to work at a different level (i.e. generated text, using source code in a programming language such as C or Smalltalk) during performance analysis than that in which he worked while programming (i.e. visually, using parts and interactions), which may be confusing, error prone, and inefficient.

End-users often complain about the performance of programs written using visual programming development environments. One of the main reasons for performance problems in these programs is that the programmer is usually oblivious to the performance implications of the programs he creates. The visually-created program may perform, under the covers, actions that are time-consuming, and which could have been optimized (or avoided) if the programmer had known about them. Consultants are often called in to assist programmers in performance tuning of their visually-created applications, increasing the overall cost of those applications. Because tools adapted to the special characteristics of the visual programming environment are not currently available to these consultants, an inordinate amount of time is expended in the tuning process. By providing a technique that allows tracing and analyzing these visually-created programs, program performance can be improved effectively and efficiently, reducing the time and expense involved. This, along with the improved program performance, will greatly increase the acceptance of visually-created programs by end-users.

Accordingly, what is needed is a technique for analyzing the runtime performance characteristics of visual programs. This technique must account for the specialized nature of visual programs, which are typically created by graphically specifying interactions between pre-built components. The execution information gathered during this process must provide information that is useful to the programmer working in the visual programming environment, indicating performance data in terms of elements that correspond to a visual program.

SUMMARY OF THE INVENTION

An object of the present invention is to provide a technique for runtime performance analysis of a visual program.

Another object of the present invention is to provide this technique by defining a data collection technique that accounts for the specialized nature of visual programs.

A further object of the present invention is to provide this technique by counting the number of times a particular visual programming element is executed.

Yet another object of the present invention is to provide this technique by creating information on the length of time required to execute visual programming elements.

It is another object of the present invention to provide this technique using information expressed in terms of the elements used by a visual programmer.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a software-implemented technique for providing runtime performance analysis in a computing system having a capability for visual programming, comprising instrumenting a selected one of one or more visually-created programs according to a visual programming performance data collection technique, and gathering execution information using the instrumented program. Preferably, the instrumenting step further comprises locating one or more elements of interest according to the performance data collection technique, and adding a plurality of code hooks for each of the located elements. Optionally, the instrumenting step further comprises enabling a user of the computing system to select elements of interest from among a plurality of elements defined according to the performance data collection technique. Preferably, the gathering step further comprises executing one or more benchmarks against the instrumented program, and logging an entry upon detection of any of the code hooks during the subprocess for executing. Preferably, the logged entry comprises an indication that the located element corresponding to the detected code hook has been executed, and/or an indication of an elapsed execution time for the located element corresponding to the detected code hook. The performance data collection technique preferably comprises execution information based on a plurality of visual elements, the plurality comprising events, actions, connections, and attributes. The computing system may reside in a computer network.

The present invention will now be described with reference to the following drawings, in which like reference numbers denote the same element throughout.

DESCRIPTION OF THE PREFERRED EMBODIMENT

Figure 1:
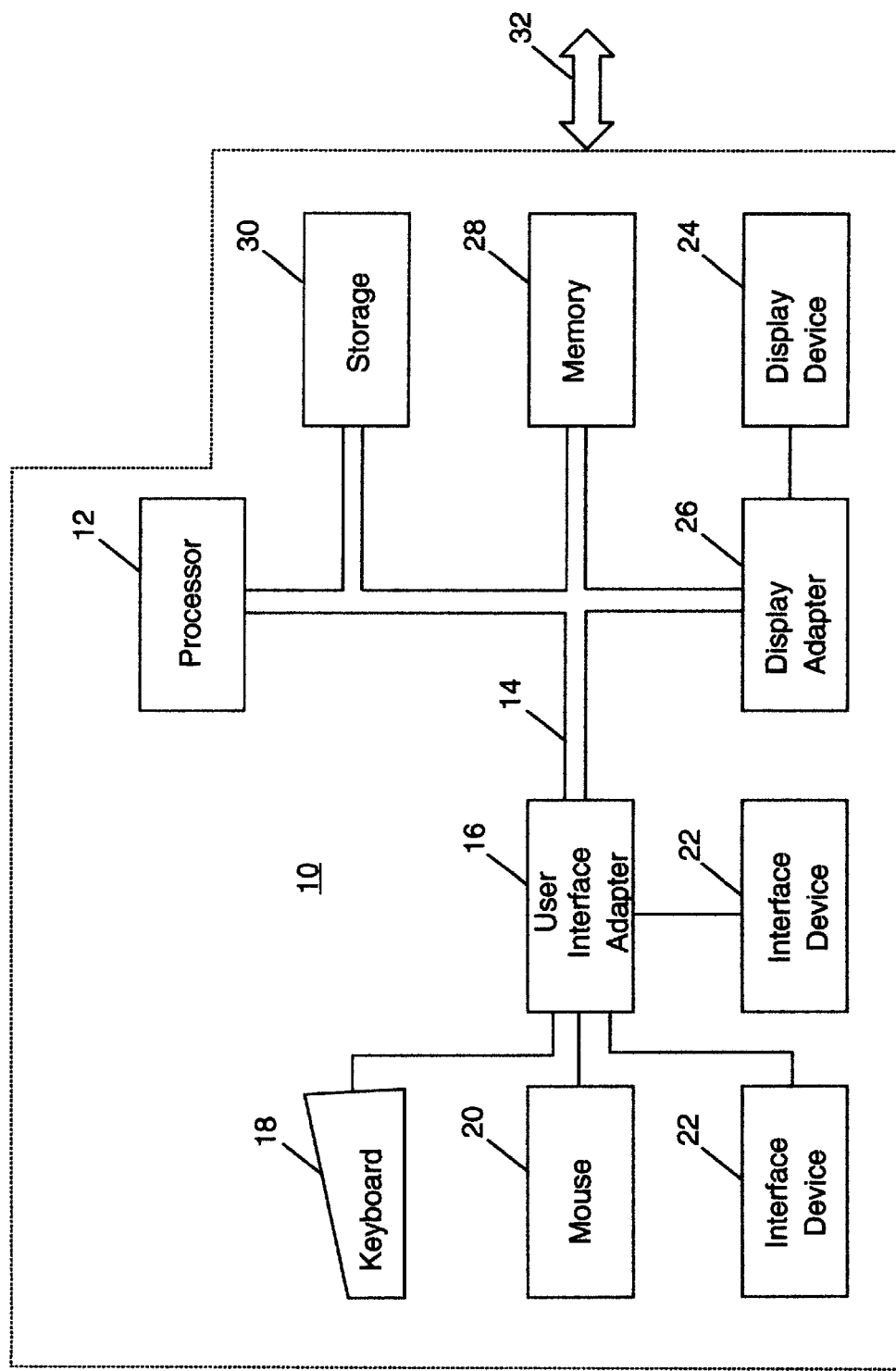
FIG. 1 is a block diagram of a computer workstation environment in which the present invention may be practiced.

FIG. 1 illustrates a representative workstation hardware environment in which the present invention may be practiced. The environment of FIG. 1 comprises a representative computer or intelligent workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate via a communications channel 32 with other computers or networks of computers. The workstation 10 may be associated with such other computers in a local area network (LAN) or a wide area network (WAN), or the workstation 10 can be a client in a client/server arrangement with another computer, etc. All of these configurations, as well as the appropriate communications hardware and software, are known in the art.

Figure 2:
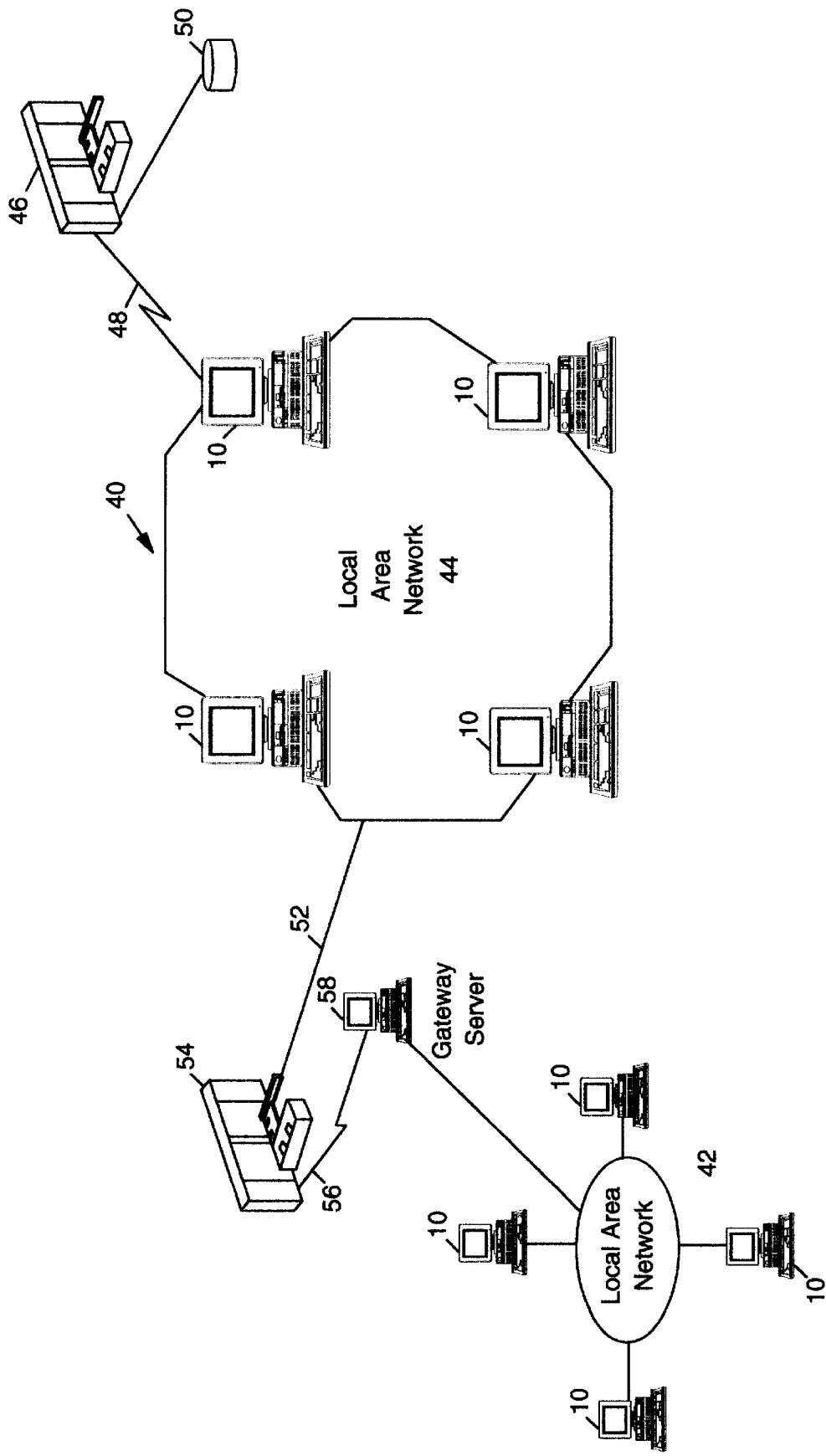
FIG. 2 is a diagram of a networked computing environment in which the present invention may be practiced.

FIG. 2 illustrates a data processing network 40 in which the present invention may be practiced. The data processing network 40 may include a plurality of individual networks, including LANs 42 and 44, each of which includes a plurality of individual workstations 10.

Alternatively, as those skilled in the art will appreciate, a LAN may comprise a plurality of intelligent workstations coupled to a host processor.

Still referring to FIG. 2, the data processing network 40 may also include multiple mainframe computers or servers, such as a mainframe computer 46, which may be preferably coupled to the LAN 44 by means of a communications link 48. The mainframe computer 46 may be implemented utilizing an Enterprise Systems Architecture/370, an Enterprise Systems Architecture/390 computer available from IBM, etc. Depending on the application, a midrange computer, such as an Application System/400 (also known as an AS/400) may be employed. "Enterprise Systems Architecture/370" is a trademark of IBM; "Enterprise Systems Architecture/390", "Application System/400", and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically accessed by the microprocessor 12 of the workstation 10 from long-term storage media 30 of some type, such as a CD-ROM drive or hard drive. In a client-server environment, such software programming code may be stored with storage associated with a server. The software programming code may be embodied on any of a variety of known media for use with a data processing system, such as a diskette, hard drive, or CD-ROM. The code may be distributed on such media, or may be distributed from the memory or storage of one computer system over a network of some type to other computer systems for use by such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

The client-server environment in which the present invention may be used includes an Internet environment, or an intranet environment. Additionally, the present invention may be practiced in an environment structured according to a three-tiered architecture, whereby a client-server environment is extended by adding data repositories as a third tier (such that the server now occupies the middle tier).

The preferred embodiment of the present invention will now be discussed with reference to FIGS. 3 through 6.

In the preferred embodiment, the present invention is implemented as a computer software program. The program code of the preferred embodiment may be implemented as objects (classes and methods) in an object-oriented programming language such as Smalltalk, or as instructions in a conventional procedural programming language (such as the C programming language).

The performance analysis technique of the present invention separates monitoring of interactions between components from the underlying system code which implements these interactions. A data collection technique for runtime performance analysis in the visual programming environment is defined, which takes into account the specialized nature of visual programs. A preferred embodiment for implementing performance analysis using this data collection technique is described.

Visual programs are created by specifying connections, or interactions, between components, or parts. The visual programmer typically does this by drawing each connection using a specialized "connection" graphical object supplied by the programming environment software. This connection object is used to signify information about component interactions, such as which component is the source, or input, and which is the target, or output. Different programming environments may use alternative methods of indicating connections, without deviating from the scope of the present invention.

As discussed earlier, it is not useful to calculate performance data for a visual program (or the visual parts of a mixed visual and conventional program) based on how many times a function was called, how much execution time was spent in various functions, or other source-code-based approaches currently used for conventional programs. The data collection technique of the present invention focuses on elements that are familiar to the visual programmer, so that analysis of these data will provide him with beneficial information. In the preferred embodiment, these elements are parts, interfaces, and connections. Because many parts are supplied by the provider of the visual programming environment (or a third party), and have therefore already been analyzed and optimized, the data collection technique of the preferred embodiment concentrates on interfaces and connections. Alternatively, parts may be included in the data collection technique without deviating from the inventive concepts of the present invention. This may be useful, for example, if the visual programmer creates new primitive parts, for which he provides new (unanalyzed and non-optimized) code.

A part may be equivalently referred to as a component, an object, etc. Examples of parts are: an application that implements a graphical user interface ("GUI"); a graphical pushbutton that can be used in the GUI to signify that a connection should fire; and a file or data repository that will be accessed. Parts are represented to the visual programmer using a graphical representation such as an icon, which may optionally be annotated with the part's name (e.g. by using a textual label). A part may have subparts, which may in turn have subparts, etc. For example, if visual programming is used to create the GUI portion of a program, one part may represent the window or screen that will be presented to the user of the resulting program. Subparts of the window part would include the graphical objects displayed in that window. If one such subpart is a drop-down list, each choice defined for the list may be a subpart of the list part. The terms "part" and "subpart" are used interchangeably hereinafter unless otherwise specified.

Parts have an interface, which defines one or more ways of accessing, or interacting with, that part. For purposes of the preferred embodiment, a part interface will be discussed in terms of attributes of the part, events the part produces or signals, and actions that the part can perform upon request. Collectively, these aspects of the part interface may be referred to as "features" of a part. Other aspects of a part interface may be used in the data collection technique of the present invention, without deviating from the inventive concepts defined herein. Examples of part attributes are: a field of the part, when the part represents a data structure such as a list, ordered collection, etc.; or a label of a pushbutton, which may, e.g., change between "Stop" and "Go" depending on the state of the application. Examples of events are: change in the value of an attribute; a user input (such as clicking on a graphical pushbutton); etc. Examples of actions are: updating a file or data repository; printing; displaying data on the GUI screen; etc.

A connection connects a feature of a source subpart to a feature of a target subpart. For purposes of the preferred embodiment, the following types of connections are considered: eventto-action (which are directed connections), and attribute-to-attribute (which may be directed connections, or bi-directional connections). Bi-directional attribute-to-attribute connections are used to synchronize data in two places. Examples of the connection types are discussed below with reference to FIG. 3. Other types of connections may be used in the data collection technique without deviating from the inventive concepts of the present invention.

Figure 3:
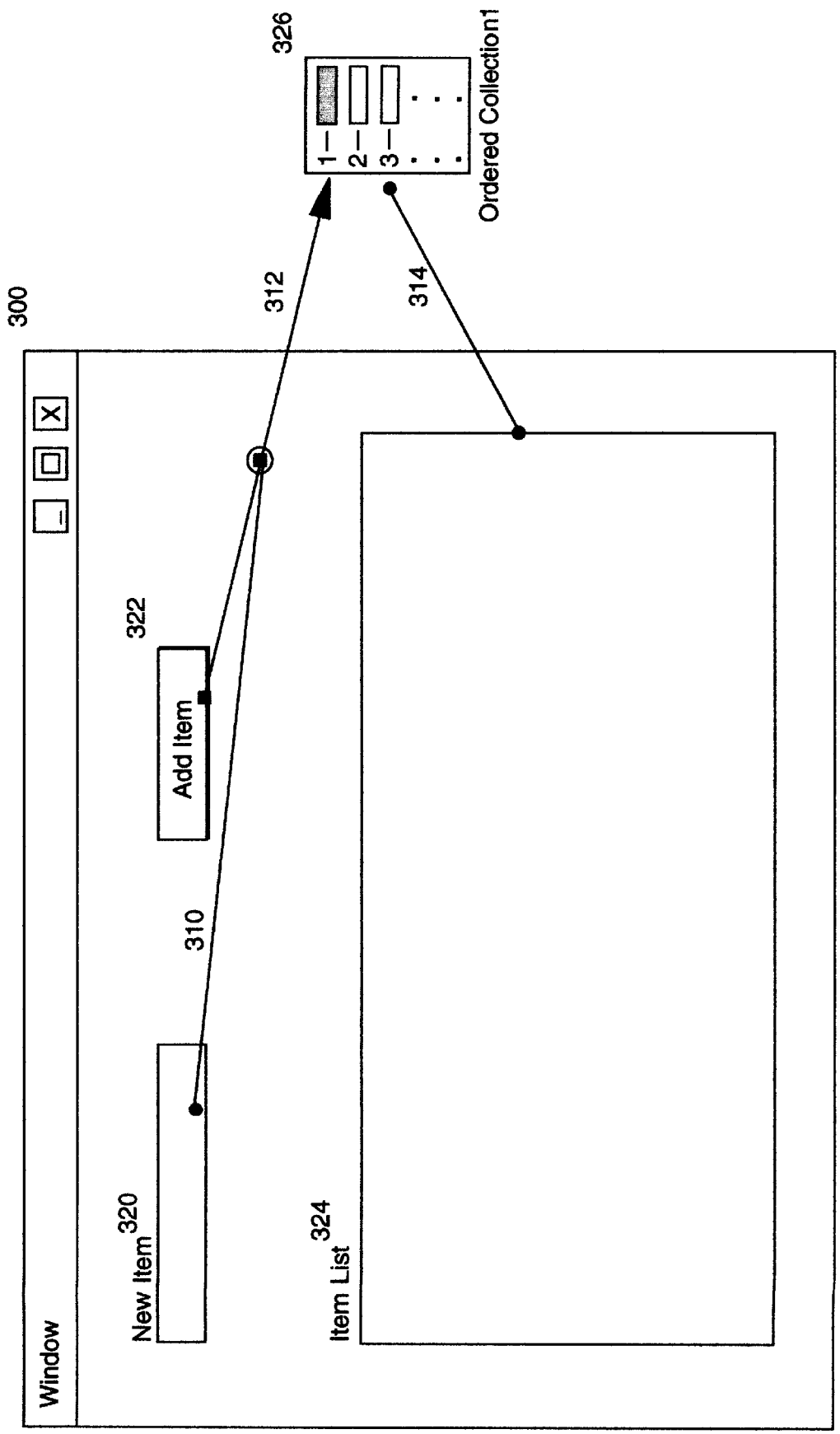
FIG. 3 illustrates a simple visually-created program.

FIG. 3 shows a graphical representation 300 of a simple visually-created program which includes three connections 310, 312, 314. This visually-created program itself is a part, and includes four subparts 320, 322, 324, 326. Connection 310 is an attribute-to-attribute connection from the "New Item" part 320 to the event-to-action connection 312, which connects the "Add Item" pushbutton part 322 to the "Ordered Collection 1" part 326. Connection 314 is an attribute-to-attribute connection between the "Item List" part 324 and part 326. By connecting the "clicked" event (not shown) of the pushbutton 322's interface to the "add:" action (not shown) of the ordered collection 326's interface, the visual programmer has specified that when connection 312 fires, the corresponding event-to-action behavior occurs. In this example, the "add:" action requires a parameter, containing the element to be added to the ordered collection 326. The input parameter is obtained from input data that the end-user will enter using the entry field in new item part 320, which is then passed as a parameter of the connection 312. Connection 314 indicates that the items in the Ordered Collection 1 part 326 are displayed in the Item List part 324. Connection 314 is a bidirectional connection, so that a change in the Ordered Collection 1 part 326 will cause an update to the data displayed in the Item List part 324, and vice versa. The visual programmer may create this program by dragging the parts 320, 322, 324, and 326 onto a window of a visual programming environment (for example, from an available-parts palette), and then connecting those parts using connections 310, 312, and 314. A pushbutton part 322 is predefined, as is its interface.

Similarly, the entry field part 320, the list part 324, and the ordered collection part 326, as well as their interfaces, are predefined. The visual programmer selects a feature from a predefined interface by popping up a window (or selecting from a drop- down list, etc.) in which the features of the part are displayed, and selecting a feature from this interface list. Suppose "add:" is a choice in the interface list of the ordered collection part, provided by the visual programming environment as a way of enabling the end-user to add new elements to an ordered collection. The visual programmer may choose this action by selecting the "add:" entry from the interface list. This visually-created program will then add an entry (passed as a parameter, as stated above) to the ordered collection each time the pushbutton is clicked. While FIG. 3 shows a simple example of a visual program, more complex programs can be created in an analogous manner. Note that the way in which the visual program is created does not form part of the present invention, and the above description is merely indicative of one way such a program can be created.

As previously discussed, a significant amount of the code executed when a user invokes a visually-created program is generated or pre-built code, which may have already been optimized. The visual programmer specifies which parts interact, the sequence in which they interact, what triggers invocation of their interaction, and what happens when they interact - i.e., all the details of connections. Actions may be written by the visual programmer to specify what happens when a connection fires. The code implementing these actions must be monitored, as well as the other aspects of connections. Thus, the data collection technique of the preferred embodiment gathers counting and timing information on the following elements: connections, attributes, events, and actions.

The execution information for the visual program elements may be kept using the following representation: $\{(n, C, T_t, T_c) \mid n$ is an element of the visual program executed C times, and spending a total of $T_t$ units of time on its execution while spending $T_c$ time in called elements$\}$. "n" identifies a specific element of the visual program, and takes on values in the range $\{1 \ldots N\}$, where "N" is the total number of elements. Alternatively, "n" may be an identifier which corresponds to a name that has been assigned to represent code elements, instead of a number. "C" corresponds to the value used to count the number of executions of element "n", and typically has the default value zero before benchmarks have been executed. "$T_t$" corresponds to the cumulative elapsed time spent on the execution of element "n", while "$T_c$" corresponds to the cumulative time spent in called elements. The entries in this representation then record, at a point in time (after execution of a portion of the benchmarks), the execution dynamics of a particular program expressed in terms of the various types of elements that have been monitored.

The data collection technique of the present invention preferably uses this approach for representing performance tracing information. The types of elements to be traced in the preferred embodiment of this data collection technique are connections, attributes, events, and actions, as previously stated. As an example of how the entries are used to represent execution data for performance monitoring and analysis, consider the firing of connections. Assume that $T_{t(p)}$ is the total execution time of the program, and that $C_{con}$ is the sum of the execution counts of all connections. By sorting the connections according to their count "C", the connections that have been fired most frequently can be determined. By comparing the value "C" of a particular connection entry to the sum "$C_{con}$", the percentage of total connection firings that corresponds to the connection of interest can be determined. By sorting the connections according to their elapsed time "$T_t$", the connections that have utilized the most total execution time can be determined. By comparing the value "$T_t$" of a particular connection entry to the sum "$T_{t(p)}$", the percentage of time spent on the processing of the connection of interest can be determined. By dividing "$T_t$" by "C" for a particular connection entry, the average time per execution for the connection of interest can be determined. By subtracting $T_t$-$T_c$ for a particular entry, the time spent locally ("local time") in the execution of a particular element, not including the time spent in elements that it invokes, can be computed. By sorting the connections according to their local time, the connections that have utilized the most local execution time can be determined. This will be useful when analyzing which connections are the ones creating bottlenecks, for example.

Similar comparisons can be made when the type of element is signalling of events, execution of an action, changing of an attribute value, etc. For bi-directional connections, a separate entry in the representation may be used to store the firing data of the connection in each direction.

An attribute-to-attribute connection may involve moving data. In the example used for FIG. 3, data would be moved from the Item List part 324 to the Ordered Collection 1 part 326 (or vice versa), as part of the process of synchronizing data in the two parts. To track how many data are moved, an additional information field may be used which accumulates the number of bytes.

A multi-dimensional array can be used to store the entries of this representation (e.g. in memory, or in a data repository), using techniques which are well known to one of ordinary skill in the art. In one aspect of the preferred embodiment, a structure such as a Smalltalk dictionary may be used to store the entries, enabling fast and efficient location of a particular entry for retrieval and/or update of its associated execution values.

The technique with which performance tracing information is collected according to the preferred embodiment will now be discussed with reference to FIGS. 4 through 6.

Figure 4:
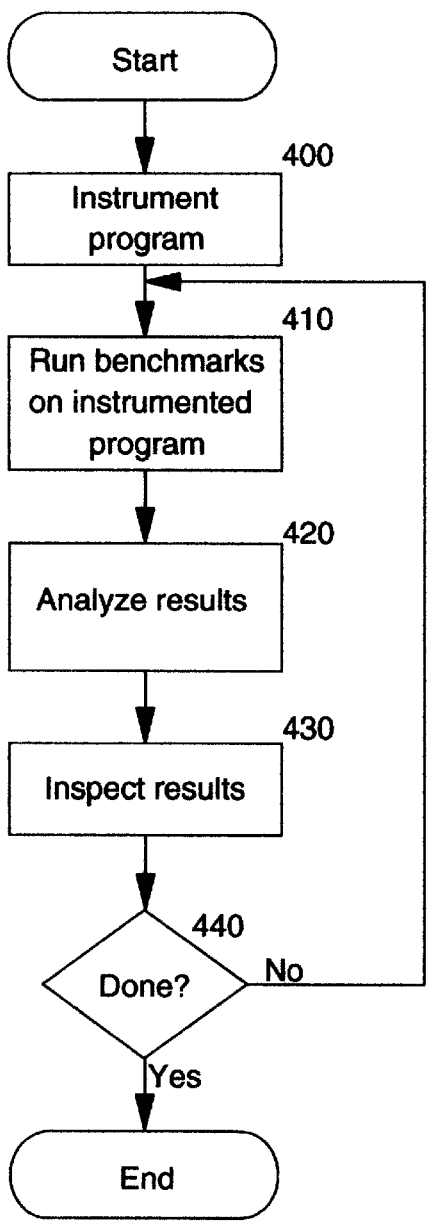
FIG. 4 illustrates a flowchart depicting a high-level flow of using the present invention to trace and analyze dynamic performance characteristics of program execution.

FIG. 4 illustrates how the runtime performance analysis technique of the present invention is used during the performance benchmarking process. The process begins at Block 400, by instrumenting the visually-created program, which will cause the performance tracing information to be gathered when performance benchmarks are executed against this program. This instrumentation process comprises adding code hooks in appropriate locations within the code that implements the visual program.

Techniques for adding hooks into code are well known in the art. In the preferred embodiment, this is accomplished by adding a small piece of code in the appropriate place for each element of interest. In an object-oriented implementation, this comprises adding a message, or method invocation. In a procedural programming implementation, this comprises adding a function or subroutine call. The method or subroutine which is invoked in response to such a code hook is described in more detail with reference to FIGS. 5 and 6. In general, code invoked in response to a hook may perform any action desired by the programmer who writes the hooked code. For purposes of the present invention, the invoked code logs the fact that the invoking element has executed; causes recording of execution timing information; and for attribute-to-attribute connections, logs the amount of data being moved.

The appropriate place and technique for adding each code hook depends on the type of element being instrumented, and accounts for the manner in which each element type is implemented in the code that was generated for the visual program. In the preferred embodiment, actions have been implemented as Smalltalk methods (or Java methods, when the underlying code of the visual program uses the Java language) written by the visual programmer; event signallings have been implemented in the visual program using a specific method invocation syntax; attributes have been implemented as instance variables, with one method for setting the value and another method for getting the value; and connections have been implemented by specification of a method invocation.

Accordingly, to instrument an action, the present invention inserts a code hook at the beginning of the action's code, and at the end of the action's code. To instrument an event signalling, the event signalling method name must be known. As an example, the following syntax may be used: "self signalEvent: eventName", where "signalEvent" is the name of the event signalling method and "eventName" changes to represent the particular type of event. Preferably, such a method will be defined at a high level in a class hierarchy, and inherited by classes lower in the hierarchy. Then, code hooks can be inserted into the code implementing this method.

To instrument an attribute, it is necessary to instrument the methods which perform the "set" and "get" operations on the attribute's value. For each attribute, these methods are located, and code hooks are inserted into the method code. Alternatively, instead of instrumenting the set method, a code hook can be inserted wherever the "changed" event for the attribute is encountered in the code (i.e. where "changed" is the "eventName" in the event signalling instrumentation described above).

To instrument a connection, the method name which is invoked for each connection type must be known, similar to the event signalling approach. Code hooks are then inserted into each of these methods. In the case of an attribute-to-attribute connection, the code hook will include a parameter which has as its value the data being moved (i.e. set or changed). The hooked code then determines the size of this data.

In the preferred embodiment, the hooked code hook begins by invoking a timing routine such as the Smalltalk method named "millisecondsToRun:". Alternatively, the hooked code may use the system time to determine the elapsed time of executing the connection. These approaches are discussed in more detail below, with reference to FIG. 5.

The method names used in the above description may differ in actual implementation, and the methods implementing the element types may differ from the techniques described. One of ordinary skill in the art will recognize that what is required is to know what code the visual programming environment generates (e.g. the names of methods or subroutine calls that are generated) for each element type of interest. The instrumentation technique can then be adapted to insert the code hooks into the proper places of that generated code.

The actual execution of the performance benchmarks, and gathering of performance information, occurs in Block 410 of FIG. 4. Note that while Block 410 is shown here as sequentially following the process of Block 400, it may be that some period of time elapses before the process of Block 410 begins. This would be the case, for example, where performance benchmarking is performed over a number of days, or in a number of separate benchmarking runs. When the visual program is not being changed during the performance benchmarking process, it is not necessary to repeat the function of Block 400 each time a new benchmarking run begins, and therefore the benchmarking process may begin at Block 410. It will be obvious to one of ordinary skill in the art how the function of Block 400 may be skipped in such a situation. For example, the preferred embodiment may begin by asking the user whether or not he wishes to execute the instrumentation process. When this query has a positive response, Block 400 is executed; otherwise, it is not.

Block 420 of FIG. 4 shows that the results of the performance tracing are analyzed after running benchmarks on the instrumented program. This comprises processing an execution trace, which has been created by the process of FIGS. 5 and 6 during execution of the instrumented program. As elements of interest are located in the trace, the corresponding entry in the representation is created and/or updated. This comprises formatting an index for this element, and then using that element to look up the corresponding entry in the stored representation. If no stored entry is found, then one must be created and then updated; otherwise, the stored entry is updated. For the counting of the number of times the corresponding element was executed, this updating process comprises incrementing the counter stored for the entry. For the storing of elapsed time values, this updating process comprises determining the total elapsed time and time spent in called logic for this particular element, and adding those values to the corresponding totals stored for the entry. For an attribute-to-attribute connection, the number of bytes that are moved is added to the cumulative total.

Figure 5:
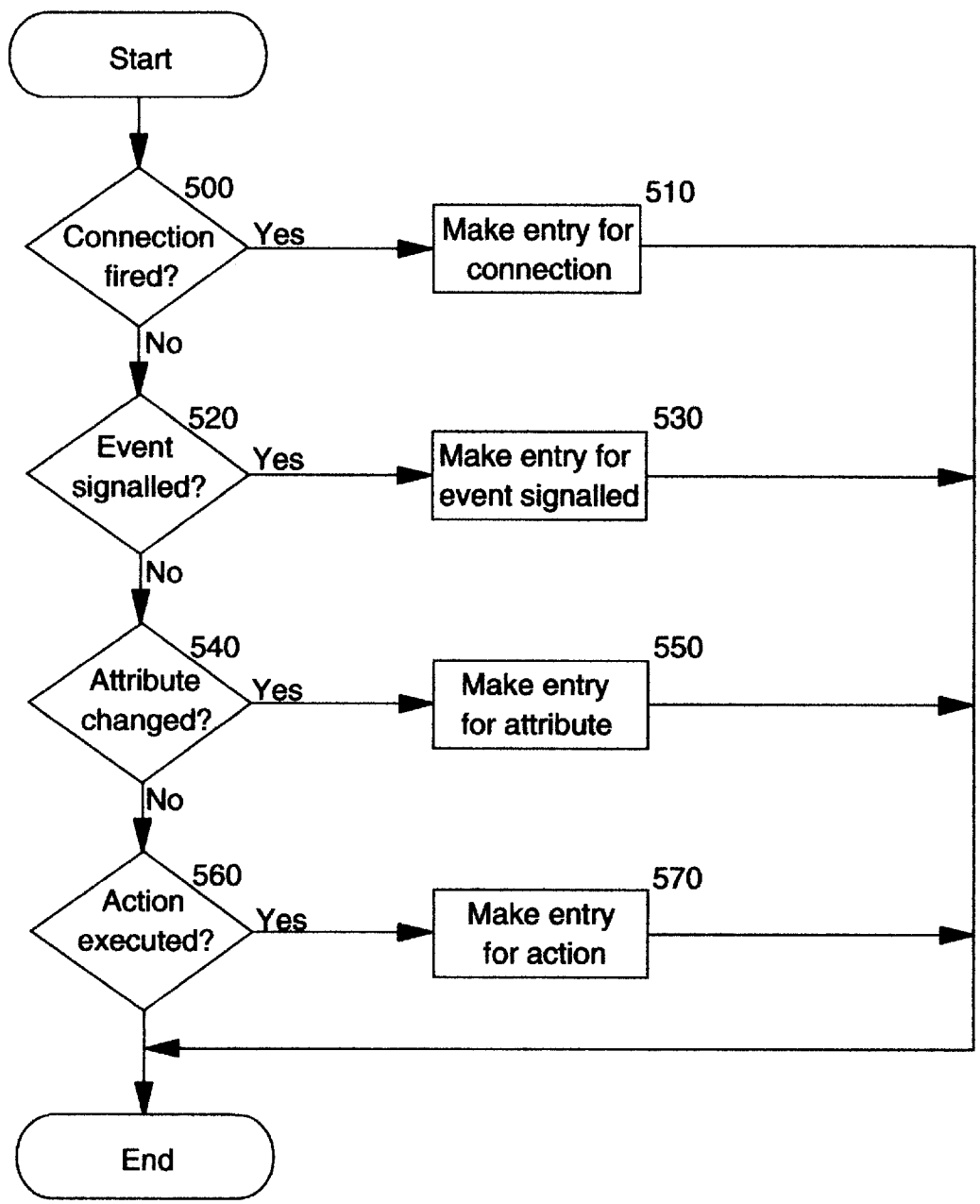
FIG. 5 illustrates a flowchart depicting logic that expands on the level of detail in FIG. 4, showing operation of a preferred embodiment of the present invention.

In an alternative aspect of the preferred embodiment, the entries created during the process of FIG. 5 may directly update the corresponding entry in the representation, without creating a trace. In that case, the analysis process of Block 420 is not required.

At Block 430, the user may inspect the results of performance tracing, to analyze the performance of his visually-created program. The inspection of results may be done in a number of ways without deviating from the inventive concepts of the present invention. The entries may be processed sequentially, and a line of text displayed which presents a human-readable interpretation of the entry. For example, for an entry indicating that an event named "pushbutton1 clicked" has been signalled 4 times, text such as "The event 'pushbutton1 clicked' has been signalled 4 times." may be displayed (or printed or written to a file, equivalently). It may be desirable to allow the user the option of seeing performance data in terms of counters, percentages, or both. For performance data using percentage information, it is necessary to first know the total value of the corresponding element, which may require processing all the element entries to obtain the cumulative value. Alternatively, this cumulative value may have been computed during execution of the performance benchmarks.

Preferably, the performance data will be displayed using the novel technique described in the related application titled "Presentation of Visual Program Performance Data", which is incorporated herein by reference.

Block 440 then asks whether the user is done with the tracing and results analysis/inspection process, and if so, the process of FIG. 4 ends; otherwise, control returns to Block 410 to perform additional performance benchmarking. It will be obvious to one of ordinary skill in the art that this represents a high-level view of the monitoring and analysis process. Any number of performance benchmarks may be performed on an instrumented program (at Block 410) before the execution results are analyzed and inspected.

FIG. 5 expands on the level of detail shown for Block 410 of FIG. 4. As is well known in the art, running a performance benchmark on a program comprises running the program in a manner that simulates normal execution. Execution of the normal program code does not form part of the present invention, and uses existing techniques. Therefore, it will not be described further herein. In the present invention, the normal program code has been augmented with code hooks, as previously described. These code hooks are executable code which, when encountered, execute to cause invocation of benchmark-specific code. FIG. 5 (with reference to FIG. 6 for more detail) illustrates the logic that is executed each time a code hook is encountered. Upon completion of the logic in FIG. 5, execution of the program continues with the next executable program instruction.

Blocks 500, 520, 540, and 560 ask what type of code element the hook was invoked for, and perform the corresponding processes required to properly log execution of elements of interest according to the data collection technique. A number of different ways of making the determinations of these blocks may be used, without deviating from the inventive concepts of the present invention. The preferred embodiment makes this determination during execution, as part of the process of FIG. 5, by querying the program stack to determine what type of code element is currently being executed. Alternatively, at the time the code hook is being inserted (see the above description of FIG. 4), an indication may be made (e.g. by including code to specify a parameter on the code hook itself) that specifies the type of program element for which the hook is being inserted. Such techniques are well known in the art.

Block 500 asks whether the code element represents firing a connection. If the answer to this test has a positive response, processing continues at Block 510; otherwise, control transfers to Block 520. At Block 510, an entry is logged with information for this connection firing. FIG. 6 explains the logging process in detail, and applies equivalently to further explain Blocks 510, 530, 550, and 570.

Block 520 is reached when the code hook that invoked the processing of FIG. 5 was not a connection firing. Block 520 asks if it was an event being signalled. If the answer to this test has a positive response, processing continues at Block 530; otherwise, control transfers to Block 540. At Block 530, an entry with information for this event signalling is logged.

Control reaches Block 540 when the code element being executed was not firing a connection or signalling an event. Block 540 asks whether it is a code element for changing an attribute. If this test has a positive response, processing continues at Block 550; otherwise, control transfers to Block 560. At Block 550, an entry with information for this attribute change is logged.

At Block 560, a test is made to determine whether the code element being executed was execution of an action. If this test has a negative response, then it may be that there is some other type of code element which is not of interest for the runtime performance analysis defined by this data collection technique. In that case, the process of FIG. 5 ends without logging any performance data. Otherwise, Block 570 logs an entry with information for execution of this action.

Figure 6:
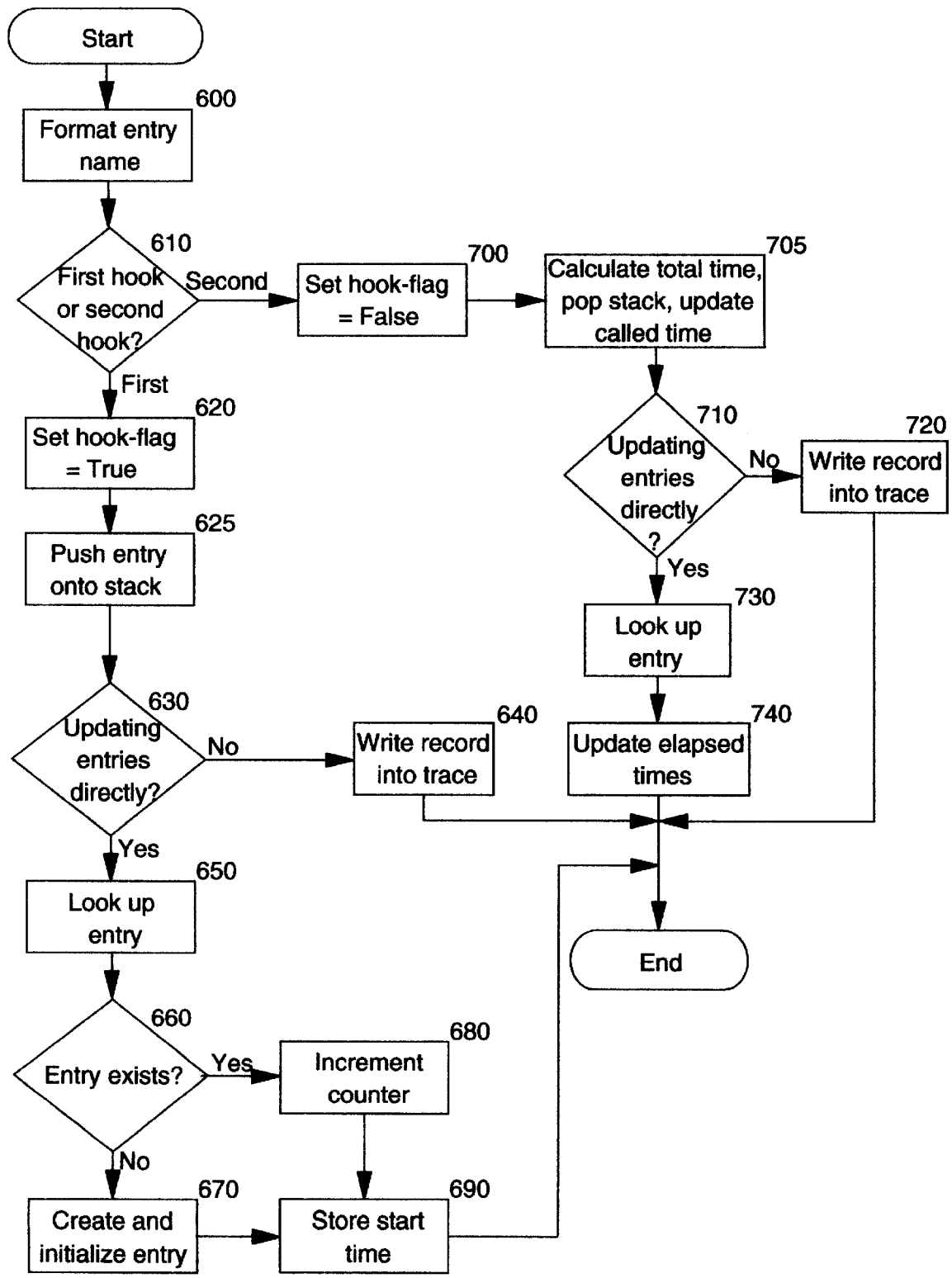
FIG. 6 illustrates a flowchart that expands on the level of detail in FIG. 5, depicting logic for logging performance data according to a preferred embodiment.

FIG. 6 applies equivalently to further explain the processes of Blocks 510, 530, 550, and 570, as previously stated. The logic shown in FIG. 6 covers both the direct updating of entries in the stored representation of performance data, and the alternative technique of writing the information into a trace file. At Block 600, an entry name is formatted. This comprises determining the name of the element for which the code hook is being executed. If numbers are used to represent elements, then the corresponding number for this element is obtained; otherwise, the element name is used. The result of Block 600 will be used to identify a particular code element for purposes of writing a trace record or locating its stored representation entry. The particular manner of implementing these processes does not form part of the present invention. Preferably, an array or structure such as a Smalltalk dictionary will be used for the stored representations, as previously stated, and this formatted identifier will be used as an index into the stored representations. Techniques for writing a record in a trace and for locating an entry for updating are well known in the art.

Block 610 asks whether this is the first code hook for this element, or the second. The preferred embodiment uses two code hooks for tracing each element of interest (one hook at the beginning of the element's execution, and another at the end).

Block 620 begins the processing of the first-encountered code hook of a pair, by setting a variable or flag to indicate that the first hook for this element is now being processed. Block 625 then pushes identifying information for this element onto a stack in order to compute the elapsed time for called elements. Block 630 then asks whether stored entries are being updated directly. If not, then Block 640 writes a record into the trace which contains performance data for the current element. This data comprises an indication that this element has been executed, and may also log the current time as the starting time for execution. Alternatively, instead of logging the current time into the trace, the current time may be stored in a variable associated with this element. Following completion of Block 640, the process of logging an entry when entries are not being updated directly is complete.

Block 650 is reached when entries of the stored representation are being updated directly. Block 650 locates the entry for this element, which is preferably stored in the form (n, C, $T_t$, $T_c$) as previously discussed, using the information formatted in Block 600. Block 660 asks whether an entry is found in this process. If not, then this is the first execution for this element, and a new entry must be created and stored in Block 670. Block 670 also initializes the execution count in the stored record to indicate that the element has executed one time (by setting the value of "C" to 1), and initializes the elapsed time values to indicate that no time has yet elapsed (by setting "$T_t$" and "$T_c$" to 0). Any further data being stored (such as byte counts) is initialized at this time as well. When an entry for this element was found, Block 680 increments the counter of executions by adding 1 to the value of "C". Block 690 is executed following both Block 670 and Block 680, and comprises storing the start time for execution of this element in a variable. The process of FIG. 6 then ends for this code hook.

Block 700 is reached when this is the second code hook for this element. Block 700 begins the processing of the second-encountered code hook of the pair, by setting a variable or flag for this element, to indicate that the first code hook is not being processed. Block 705 performs the calculation of elapsed time for called elements. First, the total elapsed execution time for the current element (which has an entry on the top of the stack) is computed by subtracting the element's starting time from the current ending time. The element entry is then popped from the top of the stack, signifying that it has completed execution. The entry now at the top of the stack is the element from which the current element was called. Thus, the total time of this current element must be added to the $T_c$ value for that calling element, which preferably is maintained in a variable along with the element identifier in the stack entry.

Block 710 then asks whether stored entries are being updated directly. If not, then Block 720 writes a record into the trace which contains further performance data for the current element. This data comprises an indication of the total execution time and called time $T_c$ (from this element's popped stack entry) for this element, and may also indicate additional data such as the number of bytes which were moved during execution. Following completion of Block 720, the process of logging an entry for the second code hook when entries are not being updated directly is complete.

Block 730 is reached when entries of the stored representation are being updated directly. Block 730 locates the entry for this element, which is preferably stored in the form (n, C, $T_t$, $T_c$) as previously discussed, using the information formatted in Block 600. (An entry will have been created for this element during processing of the first code hook.) Block 740 adds the total elapsed time ("$T_t$") and total called time ("$T_c$") to the values stored in the entry. Any further data being stored (such as byte counts) is incremented at this time as well. The process of FIG. 6 then ends for this code hook.

It will be obvious to one of ordinary skill in the art that incrementing the count of executions can be done during the processes of Blocks 720 and 740 instead of Blocks 640, 670, and 680, without deviating from the inventive concepts of the present invention. Techniques for altering the logic of FIG. 6 in this manner will be obvious.

In an alternative embodiment, elapsed time is not measured using the system time, as previously stated. Instead, elapsed time can be calculated by invoking a timing routine such as the Smalltalk method "millisecondsToRun:". A reference to the block of code to be timed is passed as a parameter to this method. When the element completes execution, an entry identifying the element and containing the computed elapsed time is written into the execution trace (or updated directly in the stored representation, if applicable).

In an optional enhancement of the preferred embodiment, the user (who may be the visual programmer) may be allowed to focus the benchmarking on some subset of the elements of the visual program. For example, he may be interested only in which connections fire, but not in events, actions, or attributes. Or, he may be interested only in a subset of the parts of the program, and what happens to the parts in that subset. In this alternative embodiment, the process of FIG. 4 may include asking the user which of the elements he wishes to monitor. Techniques for presenting options in this manner are well known in the art, as are the techniques for accepting the selections of the response, and factoring those selections into the logic of program operation. The process of Block 400 may be optimized by not instrumenting the program except in the areas pertinent to the selected elements (in which case the process of FIG. 5 will not be invoked for those elements that were not instrumented). Or, all elements may be instrumented, and Blocks 500, 520, 540, and 560 may be changed to include logic that first asks whether the user requested monitoring of this type of element, and bypassing the log process if the answer is negative.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

We claim:

1. In a computing system having a capability for component-based visual programming, computer readable code readable by said system for providing runtime performance analysis, comprising:
   a subprocess for providing one or more component-based, visually-constructed programs;
   a subprocess for instrumenting a selected one of said visually-constructed programs in order to collect runtime performance data, further comprising:
      a subprocess for locating one or more elements of interest in said selected visually-constructed program, wherein said elements comprise instances of features of said selected visually-constructed program, said features comprising one more of: (1) events to be signaled by components, (2) actions to be performed by components, (3) attributes of components, and (4) connections to be fired; and
      a subprocess for adding a plurality of code hooks to said selected visually-constructed program for each of said located elements; and
   a subprocess for gathering performance information for said selected visually-constructed program during runtime, using said instrumented program, further comprising:
      a subprocess for executing one or more benchmarks against said instrumented program; and
      a subprocess for logging an entry upon detection of any of said code hooks during operation of said subprocess for executing.

2. Computer readable code for providing runtime performance analysis according to claim 1, further comprising a subprocess for enabling a user of said computing system to select said elements of interest.

3. Computer readable code for providing runtime performance analysis according to claim 1, wherein particular ones of said logged entries comprise an indication that said located element corresponding to said detected code hook has been executed.

4. Computer readable code for providing runtime performance analysis according to claim 1, wherein particular ones of said logged entries comprise an indication of an elapsed execution time for said located element corresponding to said detected code hook.

5. Computer readable code for providing runtime performance analysis according to claim 1, wherein said computing system resides in a computer network.

6. Computer readable code for providing runtime performance analysis according to claim 1, wherein particular ones of said logged entries comprise an indication of an amount of data moved when one of said connections fired, said one of said connections being an attribute-to-attribute connection.

7. A system for providing runtime performance analysis in a computing system having a capability for component-based visual programming, comprising:
   one or more component-based, visually-constructed programs;
   means for instrumenting a selected one of said visually-constructed programs in order to collect runtime performance data, further comprising:
      means for locating one or more elements of interest in said selected visually-constructed program, wherein said elements comprise instances of features of said selected visually-constructed program, said features comprising one or more of: (1) events to be signaled by components, (2) actions to be performed by components, (3) attributes of components, and (4) connections to be fired; and
      means for adding a plurality of code hooks to said selected visually-constructed program for each of said located elements; and
   means for gathering performance information for said selected visually-constructed program during runtime, using said instrumented program, further comprising:
      means for executing one or more benchmarks against said instrumented program; and
      means for logging an entry upon detection of any of said code hooks during operation of said means for executing.

8. The system for providing runtime performance analysis according to claim 7, further comprising means for enabling a user of said computing system to select said elements of interest.

9. The system for providing runtime performance analysis according to claim 7, wherein particular ones of said logged entries comprise an indication that said located element corresponding to said detected code hook has been executed.

10. The system for providing runtime performance analysis according to claim 7, wherein particular ones of said logged entries comprise an indication of an elapsed execution time for said located element corresponding to said detected code hook.

11. The system for providing runtime performance analysis according to claim 7, wherein said computing system resides in a computer network.

12. The system for providing runtime performance analysis according to claim 7, wherein particular ones of said logged entries comprise an indication of an amount of data moved when one of said connections fired, said one of said connections being an attribute-to-attribute connection.

13. A method for providing runtime performance analysis in a computing system having a capability for component-based visual programming, comprising the steps of:
   instrumenting a selected one of one or more component-based, visually-constructed programs in order to collect runtime performance data, further comprising the steps of:
      locating one or more elements of interest in said selected visually-constructed program, wherein said elements comprise instances of features of said selected visually-constructed program, said features comprising one or more of: (1) events to be signaled by components, (2) actions to be performed by components, (3) attributes of components, and (4) connections to be fired; and
      adding a plurality of code hooks to said selected visually-constructed program for each of said located elements; and
   gathering performance information for said selected visually-constructed program during runtime, using said instrumented program, further comprising the steps of:
      executing one or more benchmarks against said instrumented program; and
      logging an entry upon detection of any of said code hooks during operation of said executing step.

14. The method for providing runtime performance analysis according to claim 13, further comprising the step of enabling a user of said computing system to select said elements of interest.

15. The method for providing runtime performance analysis according to claim 13, wherein particular ones of said logged entries comprise an indication that said located element corresponding to said detected code hook has been executed.

16. The method for providing runtime performance analysis according to claim 13, wherein particular ones of said logged entries comprise an indication of an elapsed execution time for said located element corresponding to said detected code hook.

17. The method for providing runtime performance analysis according to claim 13, wherein said computing system resides in a computer network.

18. The method for providing runtime performance analysis according to claim 13, wherein particular ones of said logged entries comprise an indication of an amount of data moved when one of said connections fired, said one of said connections being an attribute-to-attribute connection.

* * * * *